(12) United States Patent
Mastrangelo et al.

(10) Patent No.: US 10,938,868 B2
(45) Date of Patent: Mar. 2, 2021

(54) APPLICATION SERVICE INTEGRATION

(71) Applicants: Paul Mastrangelo, Malvern, PA (US);
Steve Chapman, Wellington (NZ);
Murray Hughes, Wellington (NZ)

(72) Inventors: Paul Mastrangelo, Malvern, PA (US);
Steve Chapman, Wellington (NZ);
Murray Hughes, Wellington (NZ)

(73) Assignee: Unisys Corporation, Blue Bell, PA (US)

( * ) Notice: Subject to any disclaimer, the term of this patent is extended or adjusted under 35 U.S.C. 154(b) by 194 days.

(21) Appl. No.: 14/097,505

(22) Filed: Dec. 5, 2013

(65) Prior Publication Data

US 2014/0164539 A1 Jun. 12, 2014

Related U.S. Application Data

(60) Provisional application No. 61/734,560, filed on Dec. 7, 2012.

(51) Int. Cl.
*H04L 29/06* (2006.01)
*H04L 29/08* (2006.01)

(52) U.S. Cl.
CPC ........... *H04L 65/40* (2013.01); *H04L 65/104* (2013.01); *H04L 65/1063* (2013.01); *H04L 69/08* (2013.01)

(58) Field of Classification Search
CPC ..... H04L 65/40; H04L 69/08; H04L 65/1063; H04L 65/104; H04L 45/34; H04L 67/1025; H04L 43/0811; H04L 45/00; H04L 45/306; H04L 45/308; H04L 45/56; H04L 45/566; H04L 67/327; H04L 67/02; H04L 67/12; H04L 67/2823; H04L 12/2836; G06F 9/542; G06F 9/546; G06F 9/465; G06F 2209/547; G06F 2209/544; G06F 9/541; G06Q 10/06
See application file for complete search history.

(56) References Cited

U.S. PATENT DOCUMENTS

| | | | | |
|---|---|---|---|---|
| 6,202,099 B1* | 3/2001 | Gillies | .................... | G06F 9/546 719/317 |
| 6,256,676 B1* | 7/2001 | Taylor | .................... | G06Q 10/06 709/246 |
| 7,020,717 B1* | 3/2006 | Kovarik | .................. | G06F 9/542 707/999.01 |
| 2003/0093470 A1* | 5/2003 | Upton | .................. | G06Q 10/103 709/203 |
| 2003/0101284 A1* | 5/2003 | Cabrera | ................ | H04L 45/308 719/313 |
| 2007/0280381 A1* | 12/2007 | Amini | ................ | H04L 67/2804 375/340 |

(Continued)

*Primary Examiner* — Dhairya A Patel
*Assistant Examiner* — Clifton Houston

(57) ABSTRACT

An application services broker includes a plurality of adapter modules, each of which are associated with a respective application service. Application service data is received from a first application service and converted to a first message having a predefined message format by a first adapter module associated with the first application service. The first message is sent from the first adapter module to a second adapter module associated with a second application service. The first message is converted to application service data for the second application service by the second adapter module.

14 Claims, 9 Drawing Sheets

(56) References Cited

U.S. PATENT DOCUMENTS

| | | | | |
|---|---|---|---|---|
| 2008/0134202 A1* | 6/2008 | Craggs | ............... | G06F 9/542 |
| | | | | 719/313 |
| 2008/0141272 A1* | 6/2008 | Borgendale | ......... | H04L 67/2823 |
| | | | | 719/313 |
| 2008/0263152 A1* | 10/2008 | Daniels | ............... | G06Q 10/10 |
| | | | | 709/203 |
| 2011/0173346 A1* | 7/2011 | Neben | ............... | G06Q 10/00 |
| | | | | 709/246 |
| 2012/0272252 A1* | 10/2012 | Beardsmore | ......... | H04L 43/08 |
| | | | | 719/328 |
| 2013/0066940 A1* | 3/2013 | Shao | ............... | H04L 67/1025 |
| | | | | 709/201 |
| 2013/0080542 A1* | 3/2013 | Peng | ............... | H04L 69/08 |
| | | | | 709/206 |
| 2013/0173719 A1* | 7/2013 | Ahmed | ............... | H04L 67/12 |
| | | | | 709/206 |

* cited by examiner

APPLICATION SERVICE INTEGRATION

CROSS-REFERENCE TO RELATED APPLICATIONS

This application is a non-provisional application of U.S. Provisional Application Ser. No. 61/734,560, which is incorporated by reference in its entirety.

TECHNICAL FIELD

The present application relates generally to application services integration.

BACKGROUND

Enterprise application integration generally refers to integration of systems and applications across an enterprise. Communication between various applications across an enterprise is often insufficient to allow easy sharing of data, rules, etc. This lack of communication can lead to inefficiencies, wherein identical data are stored in multiple locations, or straightforward processes are unable to be automated, for example. These inefficiencies are exacerbated in cases where the applications are not readily intercompatible for purposes of data exchange.

Typically, an interface is built to interconnect individual application services. The interface converts data from one application service to a format that can be used by another application service. Interfaces are required for each corresponding set of applications to be integrated, often resulting in many point-to point interfaced services. Such tightly coupled, point to point service integration, however, is complicated and takes a long time to deliver. The addition of new services exacerbates the problem by adding linkages and dependencies and further increasing complexity and delivery time with each added service. Changes to existing services can ripple out and impact other services.

Improvements in application integration are desired.

SUMMARY

In accordance with aspects of the present disclosure, a system for integrating application services includes a plurality of adapter modules, where each adapter module corresponds to a respective application service. Each of the adapter modules is configured to convert application service data from the corresponding application service to a message having a predefined message format. Each of the adapter modules is further configured to convert a message having the predefined format to application service data for the corresponding application service. A solution module is configured to interface with a predetermined plurality of the application services. The solution module includes a plurality of the adapter modules corresponding to the predetermined plurality of the application services.

In accordance with further aspects of the disclosure, a process for integrating application services includes providing a plurality of adapter modules, where each of the adapter modules is associated with a respective application service. Application service data is received from a first application service, and the application service data from the first application service is converted to a first message having a predefined message format by a first adapter module associated with the first application service. The first message is sent from the first adapter module to a second adapter module associated with a second application service, and the first message is converted to application service data for the second application service by the second adapter module. The application service data sent to the second adapter module.

DETAILED DESCRIPTION

Figure 1:
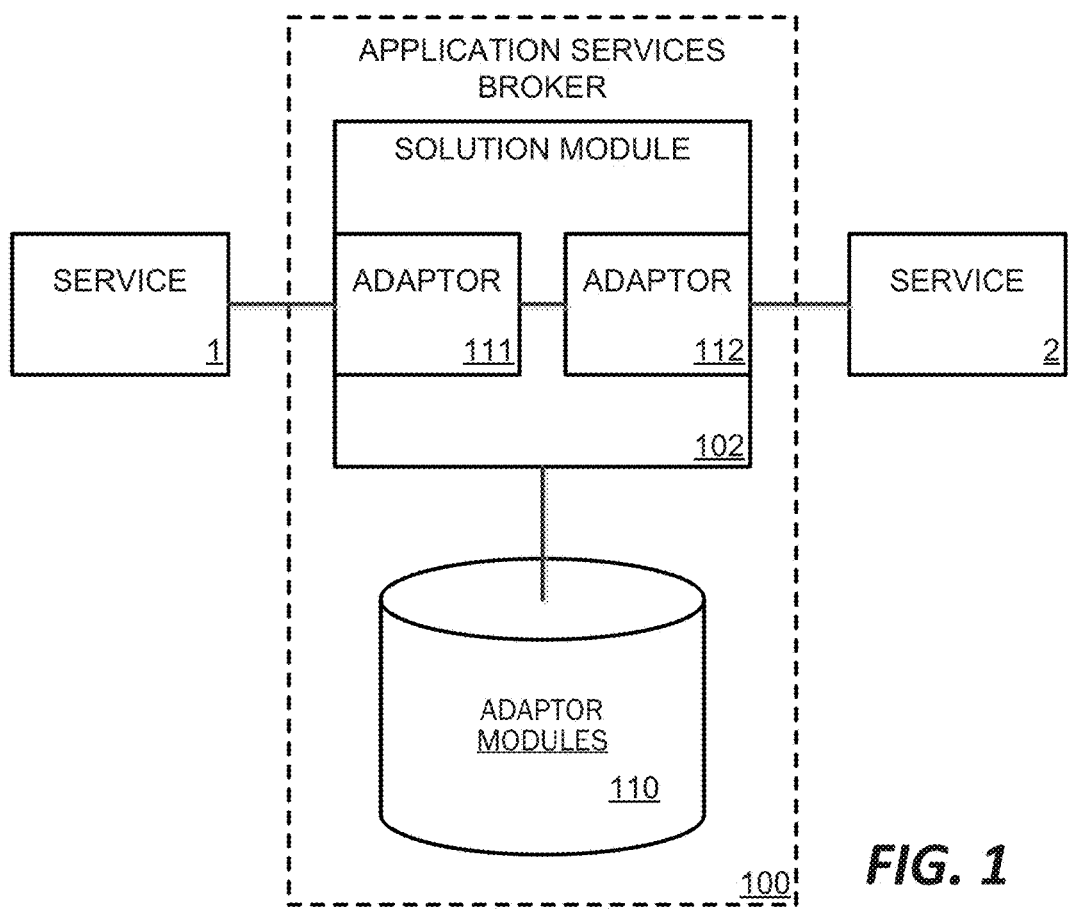
FIG. 1 is a block diagram conceptually illustrating an example of an application services broker system.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Typical application service integration is done on a point-to-point basis. An interface is built to interface individual application services, such that each corresponding set of applications to be integrated requires a unique interface. These point-to-point service integrations, however, can be complicated and take a long time to deliver. The addition of new services exacerbates the problem, requiring additional linkages and dependencies, often further increasing complexity and delivery time with each added service. The result is often a "tangle" of point-to-point integrations that is difficult to maintain, and where changes to existing services can ripple out and impact other services.

In accordance with aspects of the present disclosure, system and methods for integrating application services are provided. The disclosed systems and methods are implemented by an "application services broker" to establish application service integration that is centralized and more loosely coupled. Rather than requiring point to point interfaces between each service to be integrated, an extensible library of reusable adaptors and mediators is developed to provide an embeddable and stand-alone container. In various embodiments, the disclosed application services broker is deployed as a standalone application or a web application, for example.

FIG. 1 is a block diagram illustrating aspects of an example application services broker (ASB) system 100. The ASB system 100 includes a solution module 102 and an adaptor library 110 having a plurality of adapter modules.

In the simplified example shown in FIG. 1, the solution module 102 includes two adaptor modules 111, 112 from the adaptor library 110. The first and second adaptor modules 111, 112 are configured to interface with respective first and second services 1, 2. Thus, rather than develop an interface that directly integrates the first and second application services 1, 2, the ASB 100 provides a modular interface system, where a collection of adaptor modules 110 are provided, each corresponding to a respective service.

Typically, the ASB system 100 is configured for integrating more than the two application services 1, 2 shown in the simplified example of FIG. 1. The solution module 102 may function to group together a large number of adaptor modules 110 (sometimes deployed as bundles) so as to deploy the adaptor modules 110 efficiently.

Each adapter module corresponds to a respective application service, and each of the adapter modules is configured to convert application service data from the corresponding application service to a message having a predefined message format. Further, the adapter modules are configured to convert a message having the predefined format to application service data for their corresponding application services.

In various embodiments discussed herein, the application services that are interconnected by way of the ASB 100 can take a variety of forms. Example application services that can be interconnected via the ASB 100 include a web-based Video Management System (e.g., uVMS), speech-to-text (STT), text-to-speech (TTS), Notification Services, a data service (e.g., DDM), or web based social media services. Other types of application services, in particularly hosted application services, could be integrated via the ASB as well.

Figure 2:
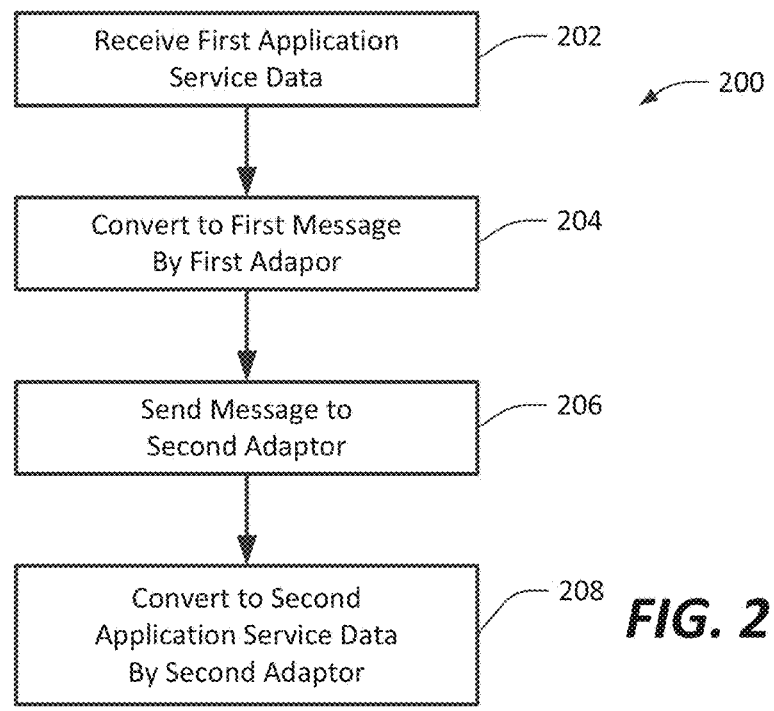
FIG. 2 is a process flow diagram illustrating an example of a method for integrating application services.

FIG. 2 illustrates a method 200 for integrating application services that may be implemented by embodiments of the ASB 100. In block 202, application service data is received by the solution module 102 from the first application service 1. The application service data from the first application service 1 is converted to a first message having a predefined message format by the first adapter 111 in block 204. The first message is sent from the first adapter 111 to the second adapter 112 in block 206, and in block 208 the first message is converted to application service data for the second application service 2 by the second adapter 112.

Figure 3:
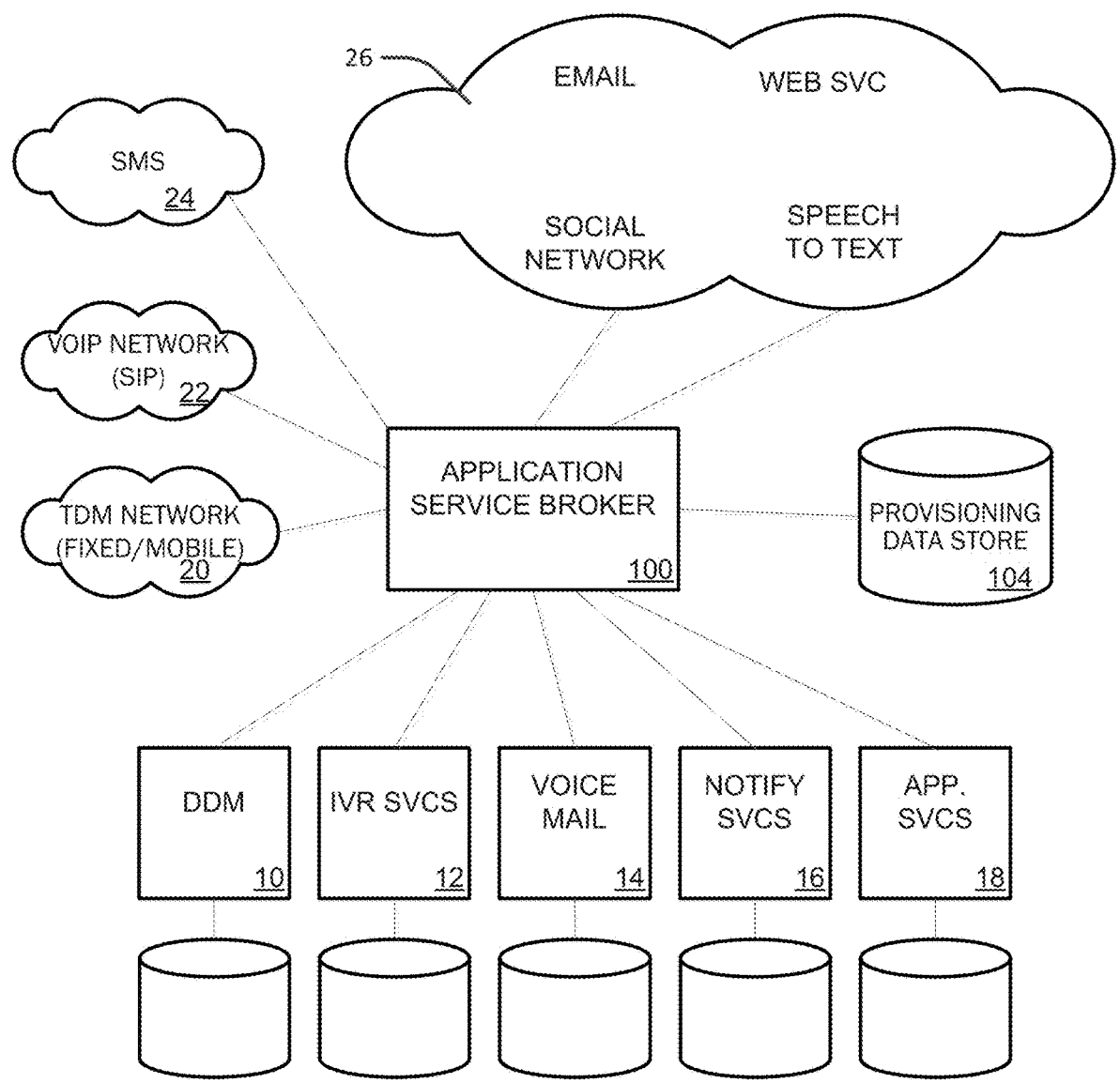
FIG. 3 is a block diagram illustrating an example of an application service integration environment.

FIG. 3 illustrates further aspects of an example implementation of the ASB system 100. Examples of the ASB system 100 provide an integration platform as a single integration gateway for services. In FIG. 3, a variety of application services interface with the ASB 100, including enterprise services such as database management services 10, interactive voice response services 12, voice mail services 14, notification services 16, application services 18, etc. External services such as TDM and VOIP networks 20, 22, short messaging services 24, as well as other internet-based services 26 further interface with the ASB 100.

As illustrated in FIGS. 1 and 2, each service interfaces to the ASB 100 alone via corresponding, customized adapter modules 110. A data storage device 104 is accessible by the ASB, containing the adapter modules 110, among other things. In disclosed embodiments, a given application service publishes data to the ASB 100 only once, and other services can subscribe to the data with the ASB 100 managing the data distribution.

In this manner, examples of the ASB system 100 are able to provide rapid integration, allowing a faster turnaround from a solution idea to a working prototype. Abstraction of Service Application Programming Interfaces (API) may be provided to allow developers to code to a preferred interface.

Figure 4:
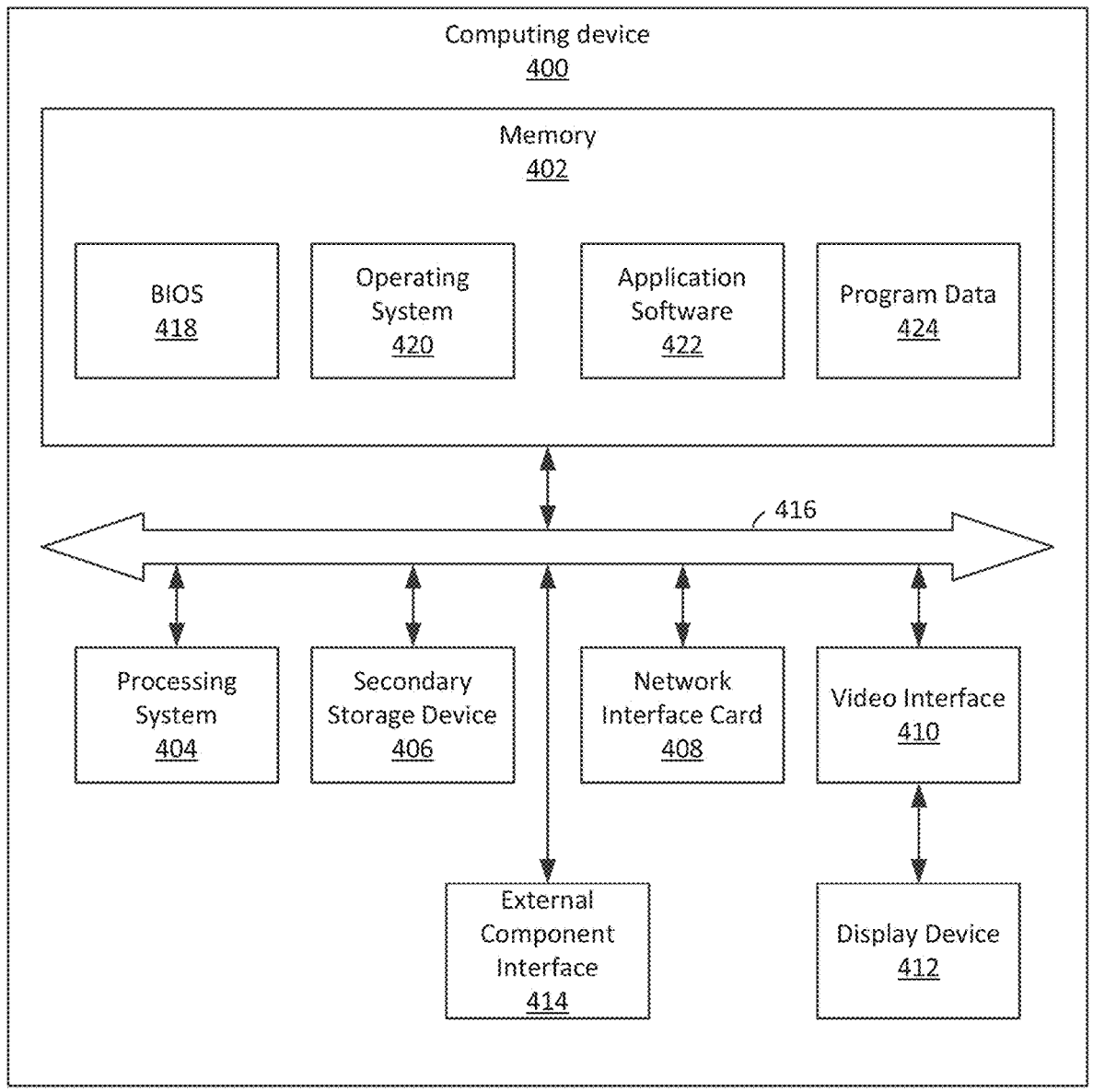
FIG. 4 is a block diagram illustrating an example of a computing device.

FIG. 4 is a schematic illustration of an example computing system in which aspects of the present disclosure, such as the ASB system 100, can be implemented. The computing system 400 can represent, for example, a computing system within which the ASB 100, as well as one or more application services could be implemented.

In the example of FIG. 4, the computing device 400 includes a memory 402, a processing system 404, a secondary storage device 406, a network interface card 408, a video interface 410, a display unit 412, an external component interface 414, and a communication medium 416. The memory 402 includes one or more computer storage media capable of storing data and/or instructions. In different embodiments, the memory 402 is implemented in different ways. For example, the memory 402 can be implemented using various types of computer storage media.

The processing system 404 includes one or more processing units. A processing unit is a physical device or article of manufacture comprising one or more integrated circuits that selectively execute software instructions. In various embodiments, the processing system 404 is implemented in various ways. For example, the processing system 404 can be implemented as one or more physical or logical processing cores. In another example, the processing system 404 can include one or more separate microprocessors. In yet another example embodiment, the processing system 404 can include an application-specific integrated circuit (ASIC) that provides specific functionality. In yet another example, the processing system 404 provides specific functionality by using an ASIC and by executing computer-executable instructions.

The secondary storage device 406 includes one or more computer storage media. The secondary storage device 406 stores data and software instructions not directly accessible by the processing system 404. In other words, the processing system 404 performs an I/O operation to retrieve data and/or software instructions from the secondary storage device 406. In various embodiments, the secondary storage device 406 includes various types of computer storage media. For example, the secondary storage device 406 can include one or more magnetic disks, magnetic tape drives, optical discs, solid state memory devices, and/or other types of computer storage media.

The network interface card 408 enables the computing device 400 to send data to and receive data from a communication network. In different embodiments, the network interface card 408 is implemented in different ways. For example, the network interface card 408 can be implemented as an Ethernet interface, a token-ring network interface, a fiber optic network interface, a wireless network interface (e.g., WiFi, WiMax, etc.), or another type of network interface.

The video interface 410 enables the computing device 400 to output video information to the display unit 412. The display unit 412 can be various types of devices for displaying video information, such as an LCD display panel, a plasma screen display panel, a touch-sensitive display panel, an LED screen, a cathode-ray tube display, or a projector. The video interface 410 can communicate with the display unit 412 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 414 enables the computing device 400 to communicate with external devices. For example, the external component interface 414 can be a USB interface, a FireWire interface, a serial port interface, a parallel port interface, a PS/2 interface, and/or another type of interface that enables the computing device 400 to communicate with external devices. In various embodiments, the external component interface 414 enables the computing device 400 to communicate with various external components, such as external storage devices, input devices, speakers, modems, media player docks, other computing devices, scanners, digital cameras, and fingerprint readers.

The communications medium 416 facilitates communication among the hardware components of the computing device 400. In the example of FIG. 4, the communications medium 416 facilitates communication among the memory 402, the processing system 404, the secondary storage device 406, the network interface card 408, the video interface 410, and the external component interface 414. The communications medium 416 can be implemented in various ways. For example, the communications medium 416 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 418 and an operating system 420. The BIOS 418 includes a set of computer-executable instructions that, when executed by the processing system 404, cause the computing device 400 to boot up. The operating system 420 includes a set of computer-executable instructions that, when executed by the processing system 404, cause the computing device 400 to provide an operating system that coordinates the activities and sharing of resources of the computing device 400. Furthermore, the memory 402 stores application software 422. The application software 422 includes computer-executable instructions, that when executed by the processing system 404, cause the computing device 400 to provide one or more applications. The memory 402 also stores program data 424. The program data 424 is data used by programs that execute on the computing device 400.

Although particular features are discussed herein as included within an electronic computing device 400, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least some tangible component on which computer-executable instructions can be stored, and can be included in a computer storage device such as any of the devices discussed above. In some embodiments, computer storage media is embodied on a non-transitory storage device.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Certain embodiments of the ASB 100 provide a loosely coupled solution that can be broken into definable modules, where adding, removing, renaming, reconfiguring or modifying modules can be done without adverse effects. When integrating external services or applications such as the various examples illustrated in FIG. 3, each service typically has its own respective data format, requiring message translation to resolve the differences without requiring a change in the application service or requiring one application service to know about another service's data formats. Accordingly, the adaptor modules 110 are configured to provide translators that convert external application service data a predefined message format.

In some examples, the predetermined message format includes a set of message headers. In particular embodiments, Apache Camel headers are used. Apache Camel (camel.apache.org) is a rule-based routing and mediation engine which provides a Java object-based implementation of Enterprise Integration Patterns using an API (or declarative Java Domain Specific Language) to configure routing and mediation rules. In general, headers are name-value pairs. For example, the name can be a unique, case-insensitive string, and the value is one of a basic java types. Headers are stored as a map within the message created by the adaptor modules 110.

If a solution requires the use of a more complex and possibly hierarchical message format, the predetermined message format uses a canonical form, in which the message is defined as a value object that is serialized to the body of the message created by the adaptor modules 110.

As noted above, embodiments of the ASB 100 provide an integration platform based on messaging. Referring back to FIG. 1, each external service 1, 2 connects to a respective adaptor module 111, 112, which exchange data and invoke behavior using messages. The illustrated ASB system 100 supports either one-way asynchronous communication or two-way, synchronous communication. A one-way communication style is appropriate for data transfer and event notification messages. A two-way communication style, for example, is appropriate for remote procedure call (RPC) style command/response or query/response messages. Separate routing patterns are used to implement these communication styles as described further below.

Figure 5:
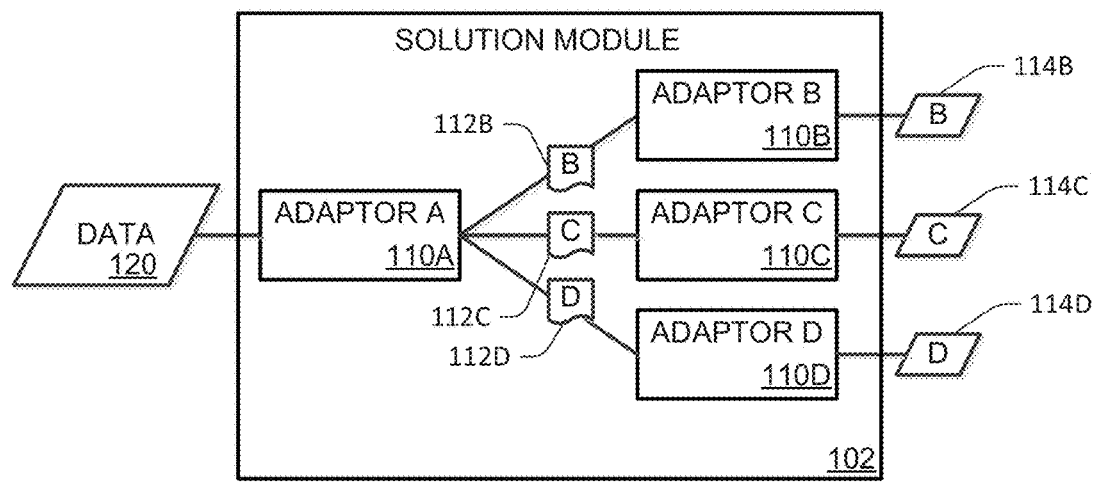
FIG. 5 is block diagram illustrating aspects of an example of a solution module for an application services broker.

The ASB system is configured to selectively route the messages between the adapter modules. FIG. 5 illustrates an example routing solution for asynchronous communication. This type of solution would be appropriate for data transfer or event notification messages with no end to end reply or acknowledgement required by the requester. In FIG. 5, data 120 is received by an incoming route in Adaptor A 110A and sent to an outgoing route on one of Adaptor B 110B, Adapter C 110C or Adapter D 110D. Adaptor A 110A receives event data 120 from an external service and converts it to a predetermined format, such as a canonical message form. In the example illustrated in FIG. 5, Adapter A 110A further publishes the data 120 in a predetermined format, for example as a Java Message Service (JMS) topic.

In the example shown in FIG. 5, Adaptor B 110B, Adaptor C 110C and Adaptor D 110D will have previously subscribed to the message topic and provided a "selection expression" with their subscription. Accordingly, Adaptor B 110B, Adaptor C 110C and Adaptor D 110D receive respective messages 112B, 112C 112D from Adaptor A 110A. Adaptor B 110B, Adaptor C 110C and Adaptor D 110D are each configured to convert the received messages 112B, 112C 112D to corresponding service data 114B, 114C, 114D for respective services.

The selection expression is used by the message broker in Adapter A 110A to filter the messages that will be presented to each topic subscriber and will typically involve pattern matching against specific message headers. This solution effectively distributes routing control to the message recipient. The adaptor modules 110A, 110B, 110C, 110D are loosely coupled with no interdependencies so it is possible to add or remove recipient adaptors without impact. By using such publish/subscribe channels, the same message will be delivered to each topic subscriber dependent on the selection expression, in use-cases where each message should have only one recipient care will be required to ensure there is no overlap in the selection expressions.

Figure 6:
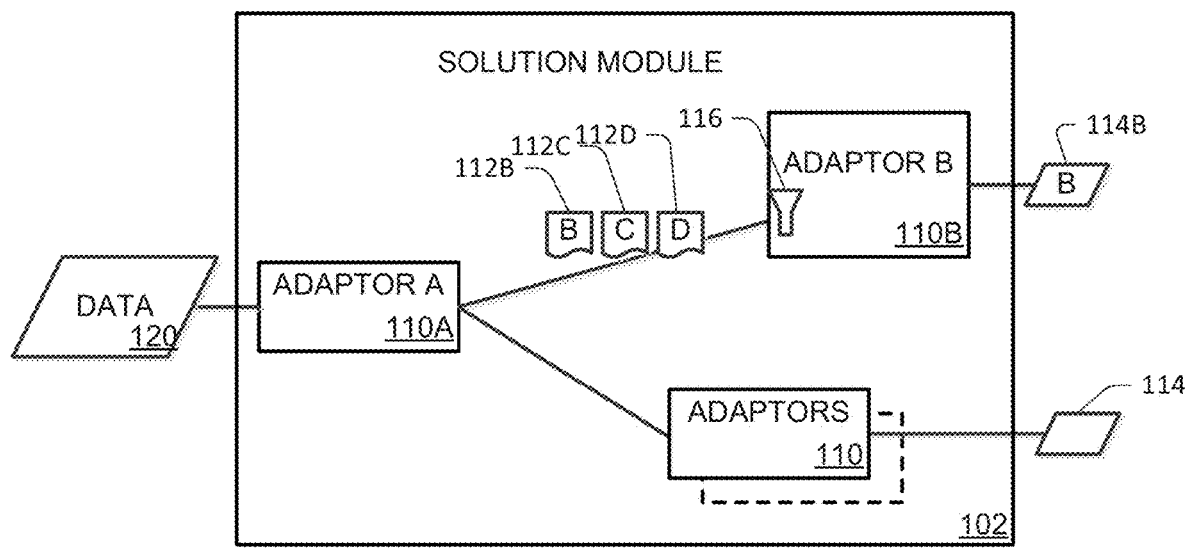
FIG. 6 is block diagram illustrating aspects of another example of a solution module for an application services broker.

FIG. 6 illustrates another example implementation of the solution module 102 illustrating an alternative message routing scheme. Some solutions may not require the resiliency or overhead of a message broker and may elect to use alternate memory based queuing technology. In FIG. 6, the Adaptor modules 110 (only Adaptor module 110B is shown in detail for ease of illustration) include a filter 116. Messages 112B, 112C, 112D are routed via message channels to each of the Adaptors 110B, 110C, 110D, and the filters 116 function to provide the appropriate message content to each of the Adapters 110B, 110C, 110D. For example, the filters 116 may be configured to receive only messages 112 having predetermined selection criteria.

Figure 7:
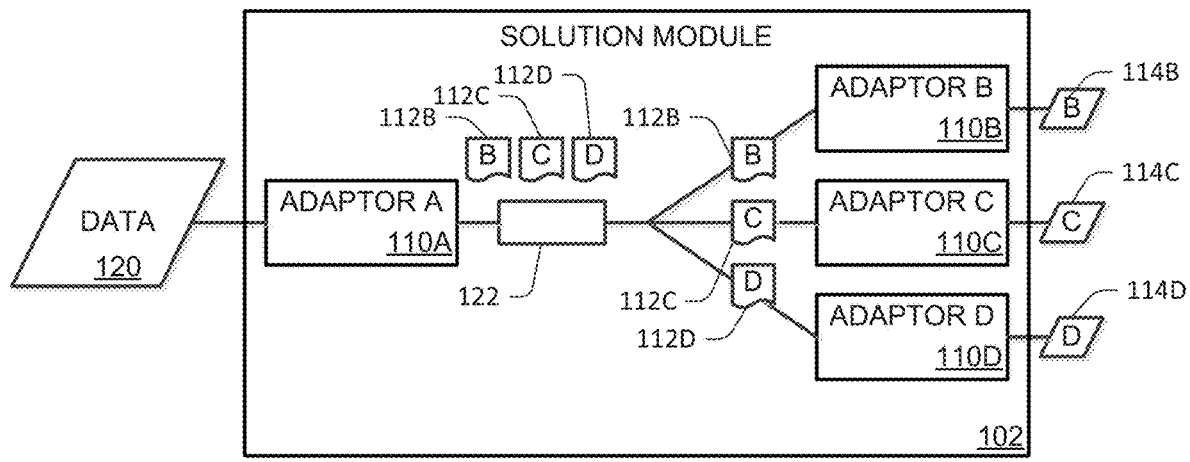
FIG. 7 is block diagram illustrating an example of adapter modules of an application services broker having a point-to-point communication arrangement.

Some embodiments are configured for synchronous communication. This type of solution is appropriate, for example, where an end to end reply or acknowledgement is required by a requester. FIG. 7 illustrates an example wherein the solution module 102 is configured for point-to-point communication. As in the examples illustrated in FIGS. 5 and 6, data 120 are received by an incoming route in Adaptor A 110A and sent to an outgoing route on one of Adaptor B 110B, Adaptor C 110C or Adaptor D 110 for delivery to an external recipient service. In some situations, a response is expected from the external recipient and that response is passed back via temporary reply channels (not depicted in FIG. 7 for clarity) to the external requester.

Thus, in the example illustrated in FIG. 7, Adaptor A 110A will receive event data 120 from the external requester and convert it to a predetermined (e.g. canonical) message form and send it to a point-to-point message channel 122. Adaptor B 110B, Adaptor C 110C and Adaptor D 110D will have previously registered as competing consumers to the point-to-point channel 122 and have provided a "selection expression" with their registration. The selection expression will be used by a message broker to find the first valid competing consumer. This solution effectively distributes routing control to the message recipient. The Adaptor modules 110 involved are loosely coupled with few interdependencies so it is possible to add or remove recipient adaptors with minimal impact. The use of a selection expression in each competing consumers makes it possible for some messages to be "orphaned" because they do not match any of the selection expressions. Thus, it is desirable to define a default, complementary, selection expression for one of the competing consumers.

For example, in the embodiment illustrated in FIG. 7 Adaptor A 110A sets a header named ASB-Event-Type in the message before sending it to the message channel 122. The competing consumers register with the following selection expressions:

Adaptor B 110B registers with selector ASB-Event-Type IN ('EventB')
Adaptor C 110C registers with selector ASB-Event-Type IN ('EventC')
Adaptor D 110D is the default, so it registers with selector ASB-Event-Type NOT IN ('EventB', 'EventC')

As recipients are added, removed, or changed, the default consumer route will also need to be changed every time.

Figure 8:
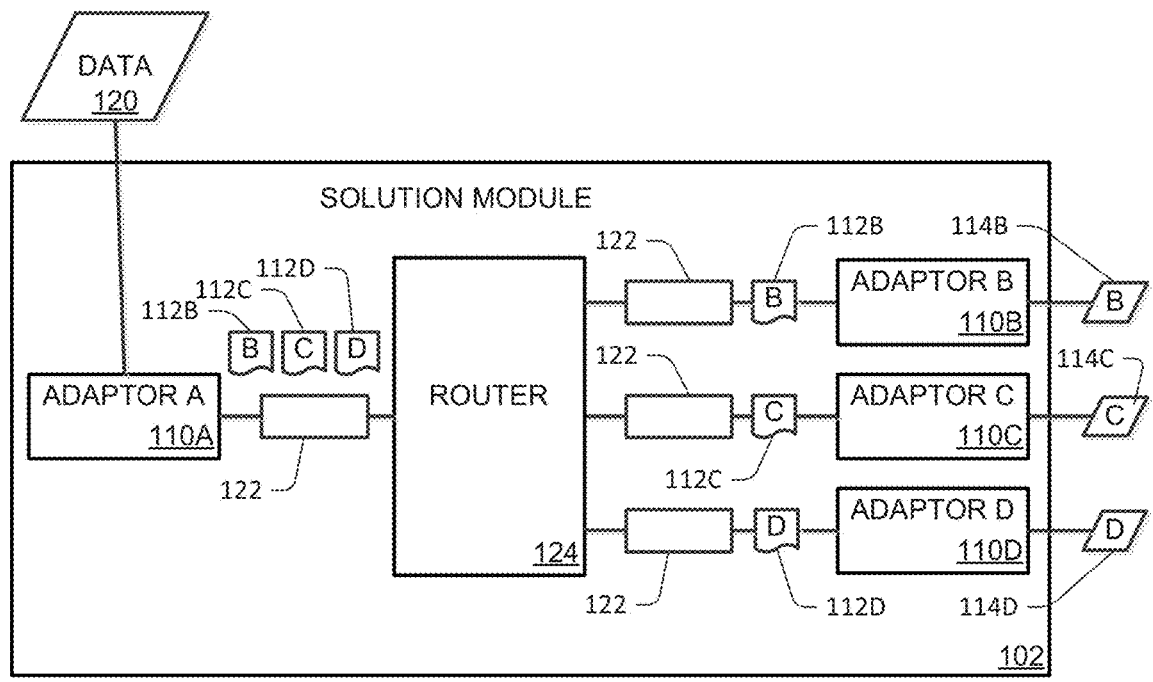
FIG. 8 is block diagram illustrating an example of adapter modules of an application services broker with a message router module router.

Some integration solutions may require differing message formats for each outbound adaptor module 110, or may require additional processing (e.g. message enrichment) before delivery to an outbound adaptor module 110. In this case a message router module 124 is provided in certain embodiments of the ASB 100. FIG. 8 illustrates an example of this routing solution. In FIG. 8, a message router module 124 is situated between Adaptor A 110A and Adaptors B, C, and D 110B, 110C, 110D. The router module 124 receives and reads the message from Adaptor A 110A via the message channel 122, then routes the message based on content of the message.

In addition to routing, the router module 124 may provide message translation and enrichment. In some implementations, the router module 124 is configured for predictive routing. Thus, knowledge of the recipient adaptor modules 110B, 110C, 110D is required. The system shown in FIG. 8 centralizes routing control in the router module 124, which introduces a tighter coupling between the router module 124 and the recipient adaptors 110B, 110C, 110D. As recipients are added, removed, or changed, the router module 124 is changed accordingly.

Figure 9:
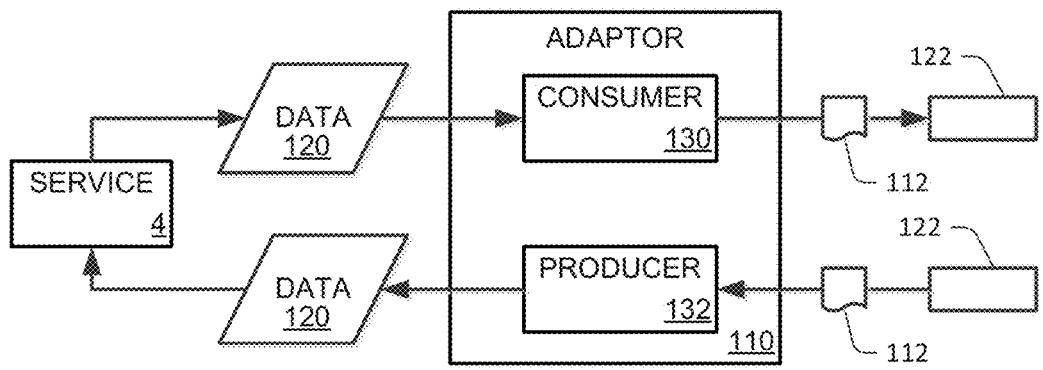
FIG. 9 is a block diagram illustrating an example of an adapter module for an application services broker.

FIG. 9 conceptually illustrates an embodiment of an adaptor module 110. The adaptor module 110 shown in FIG. 9 includes a consumer route 130 that maps external application service data 120 to a message 112. The consumer route 130 further places the message 112 on a specific datatype message channel 122. For example, an adaptor module 110 configured to interface with the DDM service 10 shown in FIG. 3 will receive a notification request from the DDM service 10 and translate it to a message 112 having a predefined format and place it in a notification message channel 122.

The adapter module 110 also includes a producer route 132 that is configured to receive messages 112 from a datatype message channel 122 and translate them into a format compatible with the proper external interface. For example, an adaptor module 110 configured to interface with a short messaging service such as the SMS service 24 shown in FIG. 3 will receive a message 112 from an SMS message channel 122, and use the received message to build an SMPP operation.

Figure 10:
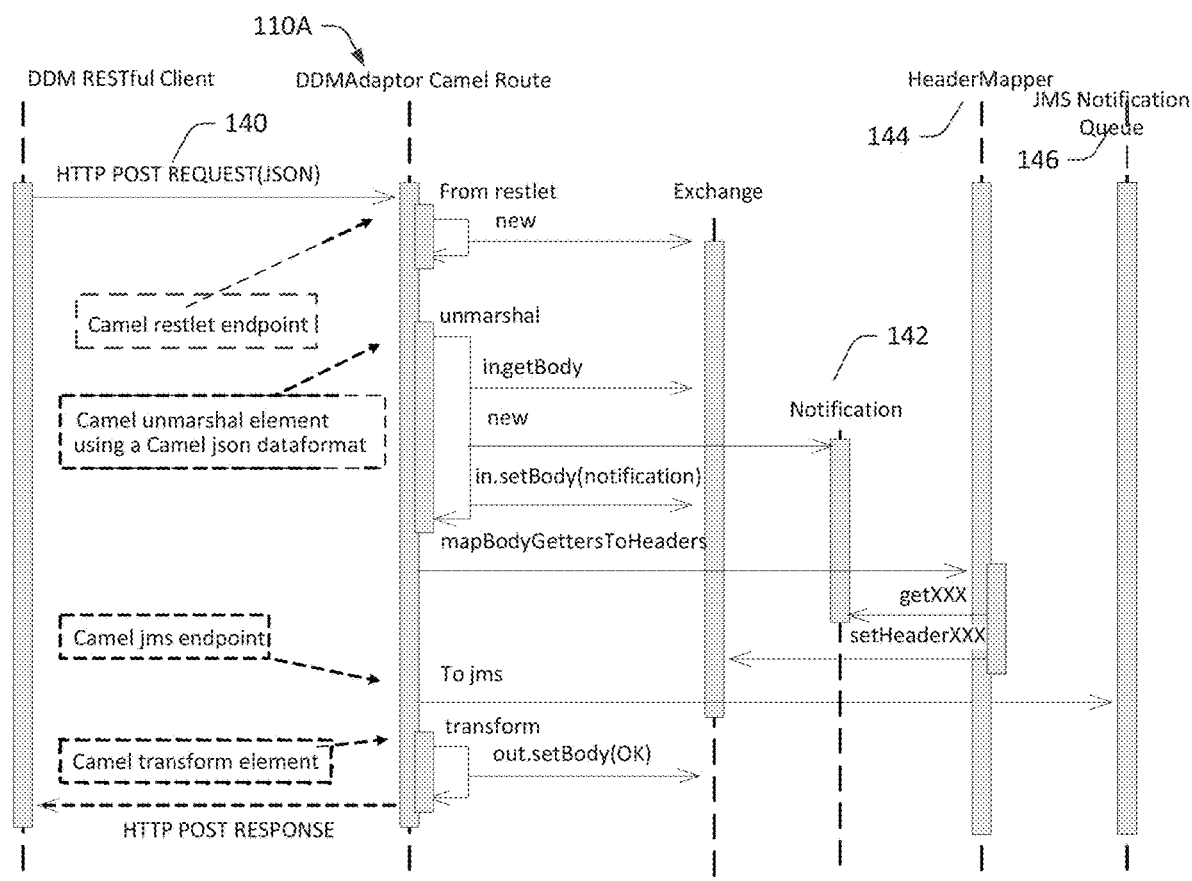
FIG. 10 is a sequence diagram illustrating an example of a DDM notification sequence for a DDM adapter module.

In some disclosed embodiments, the adaptor modules are each configured to interface with a respective external service, function or protocol that is the target of its communication. For example, a DDM Adaptor is created and configured for the external DDM service 10, and will receive messages from and send messages to DDM service 10. FIG. 10 illustrates an example consumer route DDM notification sequence for a DDM Adapter 110A in accordance with one embodiment. The illustrated DDM Adaptor 120A is implemented as a Camel route that provides a Representational State Transfer (REST) style interface for DDM. DDM will post a JavaScript Object Notation (JSON) representation 140 to a Notification Uniform Resource Identifier (URI) which is consumed by the DDM Adaptor 110A and unmarshalled to a Notification object 142. A HeaderMapper 144 maps the Notification object 142 to message headers and a correlationID header is added and the message is placed on a JMS Notification Queue 146 for asynchronous processing and a status response including the correlationID is returned to the DDM client.

Figure 11:
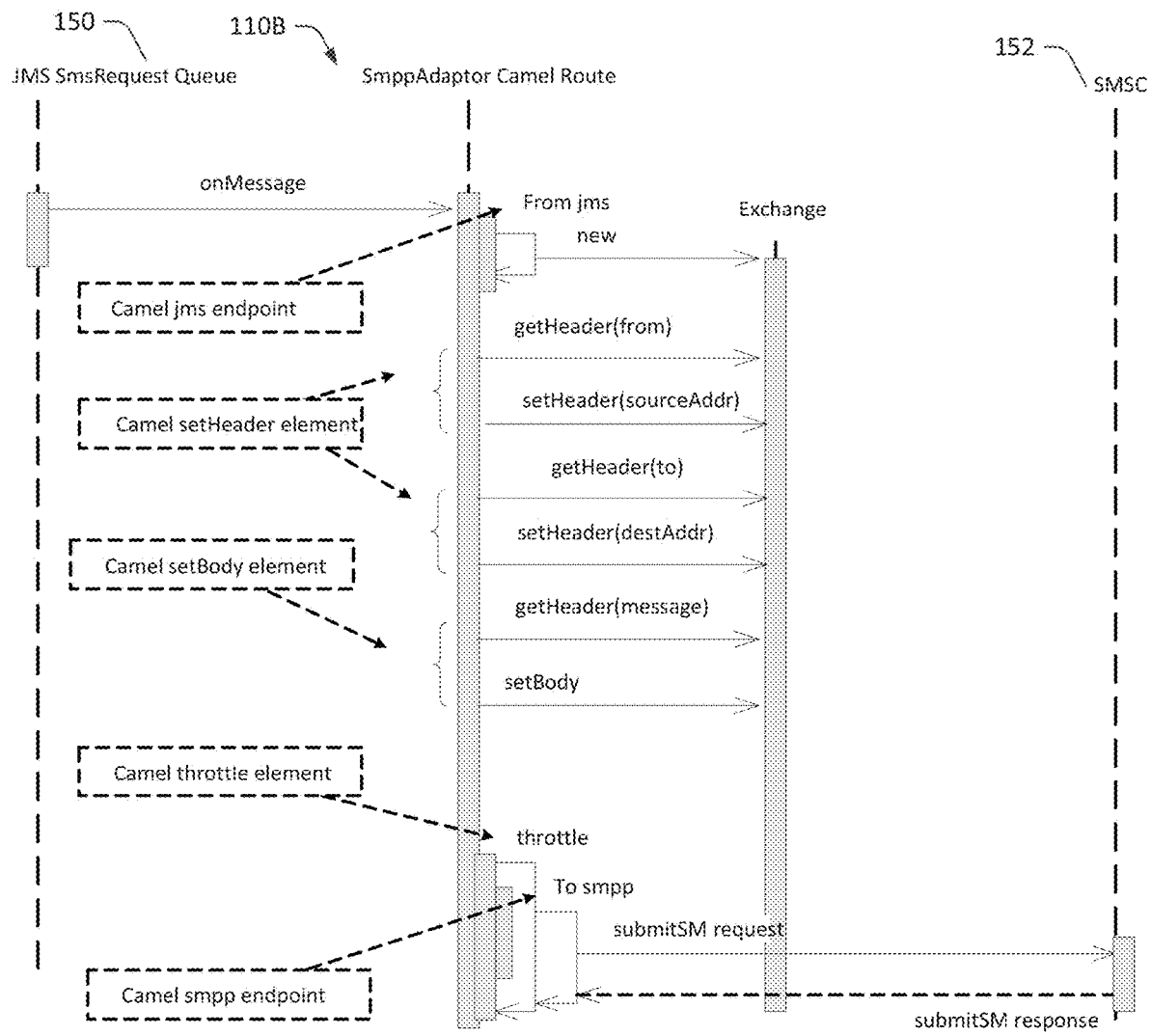
FIG. 11 is a sequence diagram illustrating an example of an SMS notification sequence for an SMPP adapter module.

An SMPP Adaptor may be created for the SMS service 24 and will receive messages from and send messages to a short message service center using the SMPP protocol, for example. FIG. 11 illustrates an example SMPP Adaptor module 110B, which is implemented as a Camel route that removes SmsRequest messages from an SmsRequest queue 150 and uses headers to format SMPP SubmitSM operation attributes and then delivers the operation to a Short Message Service Center (SMSC). In the illustrated example, the rate of SMSC operations is throttled at a configured maximum rate per second. Delivery failures may be handled by sending the message to a deadletter queue, which is processed by another camel route that logs the failure as an example of simple error handling.

Figure 12:
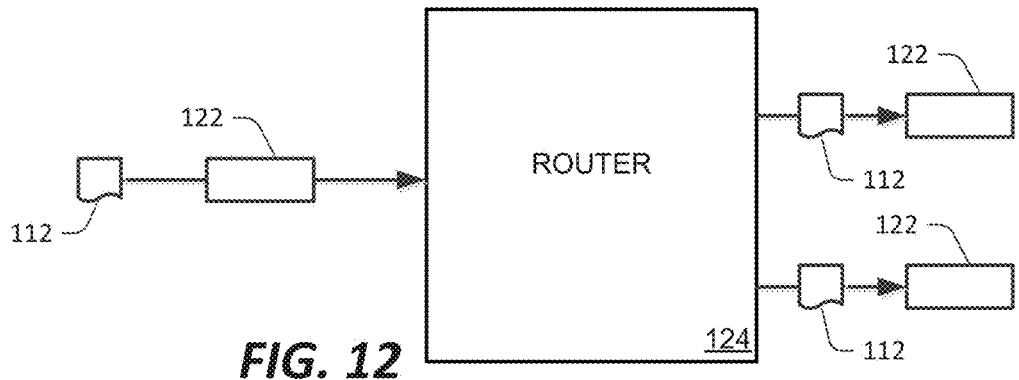
FIG. 12 is a block diagram illustrating an example of message router module for an application services broker.

FIG. 12 illustrates an example of a router module 124. In the illustrated embodiment, the router module 124 is associated with a solution that it implements. For example, a Mass Notification Mediation Router is responsible for implementing a Mass Notification solution by receiving messages from a notification message channel 122 and translating them and placing them on the appropriate message channel 122.

Figure 13:
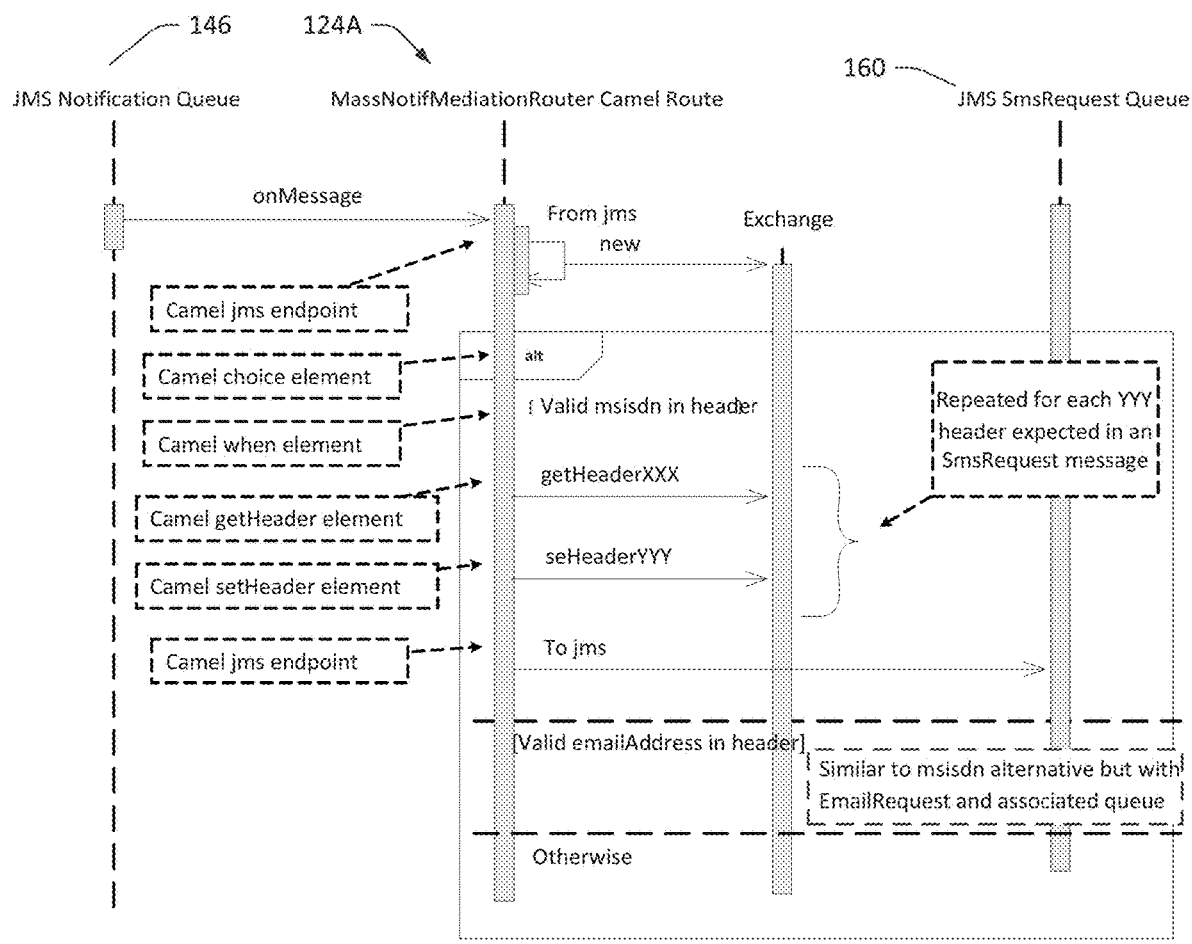
FIG. 13 is a sequence diagram illustrating an example of a DDM notification sequence for a mass notification router module.

Referring to FIG. 13, an example of a Mass Notification Mediation Router Module 124A is implemented as a Camel route that removes messages from the notification queue. Based on the message header content, an SMS Request or an Email Request message is constructed and placed on the respective SmsRequest queue 160 or an EmailRequest queue. The "choice" element in the route implements content based routing based on regular expression matching with header fields.

Figure 14:
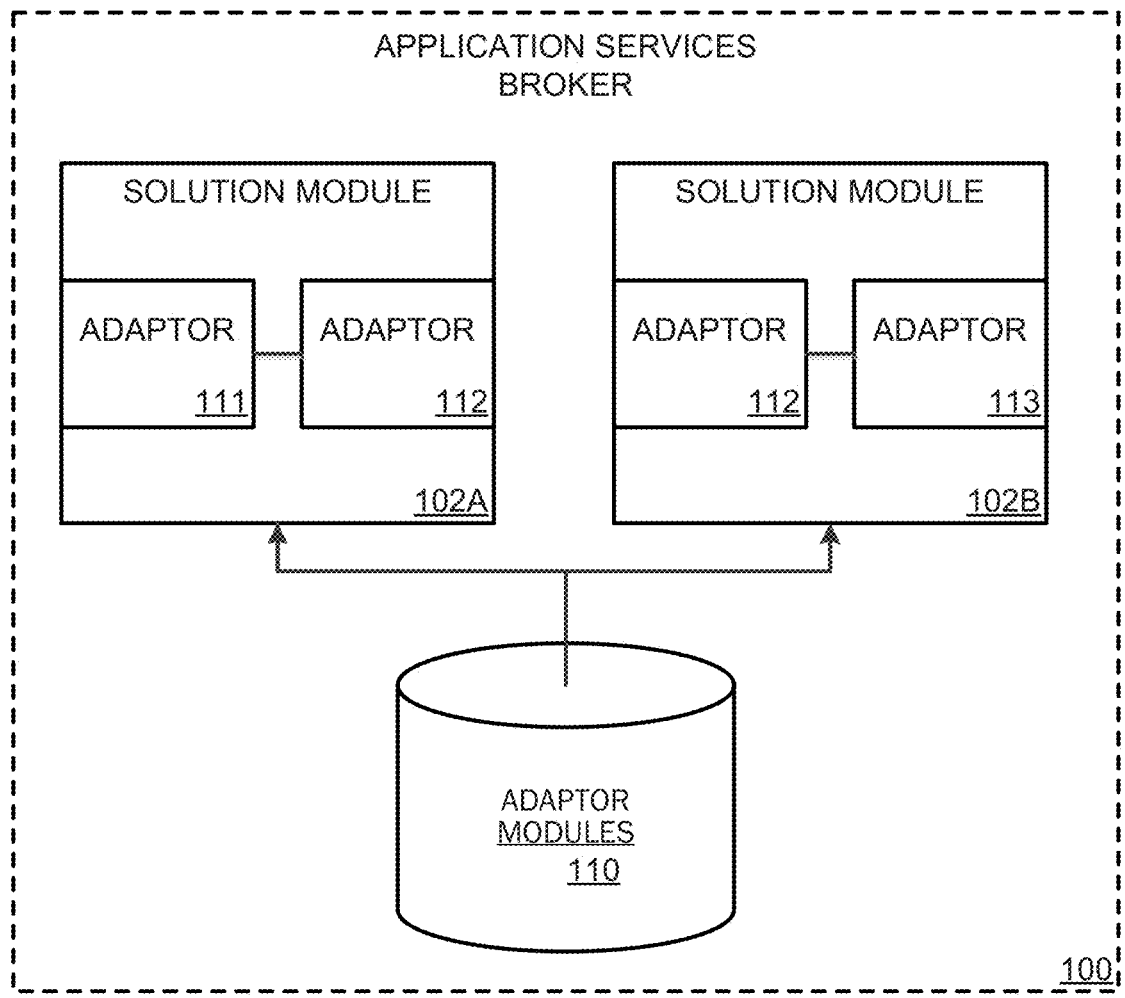
FIG. 14 is a block diagram conceptually illustrating another example of an application services broker system.

FIG. 14 illustrates aspects of another embodiment of the ASB 100 that includes a plurality of solution modules. In FIG. 14, the ASB 100 includes first and second solution modules 102A, 102B. As described herein above, the solution modules 102A, 102B are each configured to interface with application services, and thus include adapter modules corresponding to particular application services. In FIG. 14, the first and second solution modules 102A, 102B each use the adaptor module 112. Messages provided by the shared adapter module 112 could be shared by a single associated application service, or they could be replicated and consumed by multiple application services.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for integrating application services, comprising:
   at least one processor; and
   a memory operatively connected to the at least one processor, the memory comprising computer-executable instructions that, when executed by the at least one processor, perform a method comprising:
   defining one or more solution modules at an application services broker, each of the one or more solution modules configured to interface with a plurality of application services, wherein at least one of the one or more solution modules includes a plurality of application interface adapters corresponding to the plurality of application services;
   registering a first application interface adapter to publish a message topic, the first application interface adapter being associated with a first application service;
   registering a second application interface adapter to the message topic with a selection expression for its usage subscription, the second application interface adapter being associated with a target external service;
   receiving application service data in a first format from the first application service using the first application interface adapter, wherein the first format is incompatible with the target external service;
   translating the received data into messages having a predefined message format by the first application interface adapter, wherein the predefined message format provides a Java-object based implementation of enterprise integration patterns using an API to configure routing and mediation rules and includes at least one message header containing the routing and mediation rules for translating the received data into a third format compatible with the target external service;
   filtering the translated data utilizing the predefined message format;
   publishing the messages to a point-to-point channel at the application services broker;
   wherein the second application interface adapter receives selected messages from the application services broker via the point-to-point channel, the selected messages being based on the usage subscription;
   translating the data by the second application interface adapter from the predefined format at the application services broker into the second format compatible with the target external service;

wherein the first application interface adapter and the second application interface adapter are each selected from a library of a plurality of reusable adapters, and wherein two or more of the plurality of application interface adapters, including the second adapter, are subscribed to compete to receive messages from the point-to-point channel based on their respective usage subscriptions.

2. The system of claim 1, further comprising a plurality of message channels configured to selectively route the messages among the plurality of adapters including the first adapter and the second adapter.

3. The system of claim 2, wherein the message channels are point-to-point message channels configured to route messages between two predetermined adapters.

4. The system of claim 1, further comprising a message router configured to selectively route the translated data in response to content of the translated data.

5. The system of claim 1, further comprising a memory storage device accessible by the at least one processor, the memory storage device storing routing and mediation rules for translating the received data.

6. A method for integrating application services, comprising:

providing a plurality of application interface adapters as part of a library of a plurality of reusable adapters, each of the application interface adapters being associated with a respective application service;

defining one or more solution modules at an application services broker, each of the one or more solution modules configured to interface with a plurality of application services, wherein at least one of the one or more solution modules includes a plurality of application interface adapters corresponding to the plurality of application services;

registering a first application interface adapter to publish a message topic, the first application interface adapter being associated with a first application service;

registering a second application interface adapter to the message topic with a selection expression for its usage subscription, the second application interface adapter being associated with a target external service;

receiving application service data in a first format from a first application service using the first application interface adapter;

converting the application service data from the first application service to a first message having a predefined message format by the first application interface adapter, wherein the predefined message format provides a Java-object based implementation of enterprise integration patterns using an API to configure routing and mediation rules and includes at least one header containing the routing and mediation rules;

filtering the converted application service data utilizing the predefined message format;

publishing the first message to a point-to-point channel at the application services broker;

wherein the second adapter receives the first message from the application services broker via the point-to-point channel based on the usage subscription;

converting the first message in the second format to application service data for the target external service by the second application interface adapter;

sending the application service data for the target external service to the target external service, and wherein two or more of the plurality of application interface adapters, including the second adapter, are subscribed to compete to receive messages from the point-to-point channel based on their respective usage subscription.

7. The method of claim 6, further comprising:

sending a reply message from the target external service to the first application service via a temporary reply channel.

8. The method of claim 6, wherein the predefined message format includes a canonical form.

9. The method of claim 6, wherein the first message includes a selection expression.

10. The method of claim 6, wherein each adapter of the plurality of application interface adapters is configured to receive application service data from a different application service from among a plurality of hosted application services, the hosted application services selected from the group consisting of: a web-based Video Management System, a speech-to-text service (STT), a text-to-speech service (TTS), a Notification Services service, a DDM service, and a web based social media service.

11. A non-transitory computer-readable storage medium having computer-executable instructions stored thereon which, when executed by a computing system, cause the computing system to perform a method for integrating application services, comprising:

defining one or more solution modules at an application services broker, each of the one or more solution modules configured to interface with a plurality of application services, wherein at least one of the one or more solution modules includes a plurality of application interface adapters corresponding to the plurality of application services;

registering a first application interface adapter to publish a message topic, the first application interface adapter being associated with a first application service;

registering a second application interface adapter to the message topic with a selection expression for its usage subscription, the second application interface adapter being associated with a target external service;

receiving application service data in a first format from a first application service using the first application interface adapter;

converting the application service data from the first application service to a first message having a predefined message format by the first application interface adapter, wherein the predefined message format provides a Java-object based implementation of enterprise integration patterns using an API to configure routing and mediation rules and includes at least one header containing the routing and mediation rules;

filtering the converted application service data utilizing the predefined message format;

converting the first message in the predefined message format to a second format by the second application interface adapter;

publishing the first message to a point-to-point channel at the application services broker, wherein the second adapter receives the first message from the application services broker via the point-to-point channel based on the usage subscription;

converting the first message in the second format to application service data for the target external service by the second application interface adapter; and wherein two or more of the plurality of application interface adapters, including the second adapter, are subscribed to compete to receive messages from the point-to-point channel based on their respective usage subscription.

12. The computer-readable storage medium of claim 11, further comprising sending the application service data for the target external service to the target external service.

13. The computer-readable storage medium of claim 11, further comprising sending the first message to a predetermined plurality of application interface adapters.

14. The computer-readable storage medium of claim 11, further comprising:
- receiving application service data from the target external service by the second application interface adapter;
- converting the application service data from the target external application service to a second message having the predefined message format by the second application interface adapter;
- publishing the second message from the second application interface adapter to the application services broker;
- wherein the first application interface adapter is configured to receive the second message based on a usage subscription associated with the first application interface adapter when the first application interface adapter is registered;

converting the second message from the predetermined message format to application service data for the first application service by the first application interface adapter; and
- sending the application service data for the first application service in the first format to the first application service.

* * * * *